Nov. 14, 1939.   P. T. SPRAGUE ET AL   2,179,867
GAS ANALYZER
Filed Feb. 19, 1934   3 Sheets-Sheet 1
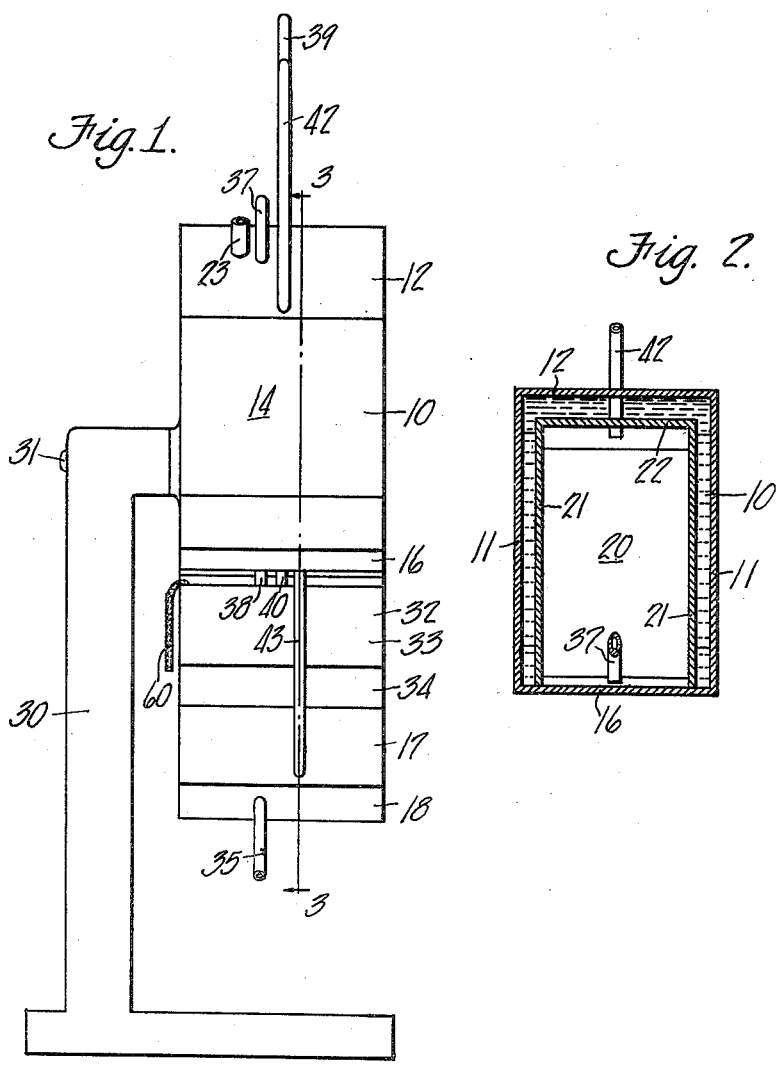
Philip T. Sprague.
Charles A. Sprague.
Arnold Soller.
   INVENTORS.
BY [signature]
   ATTORNEY.

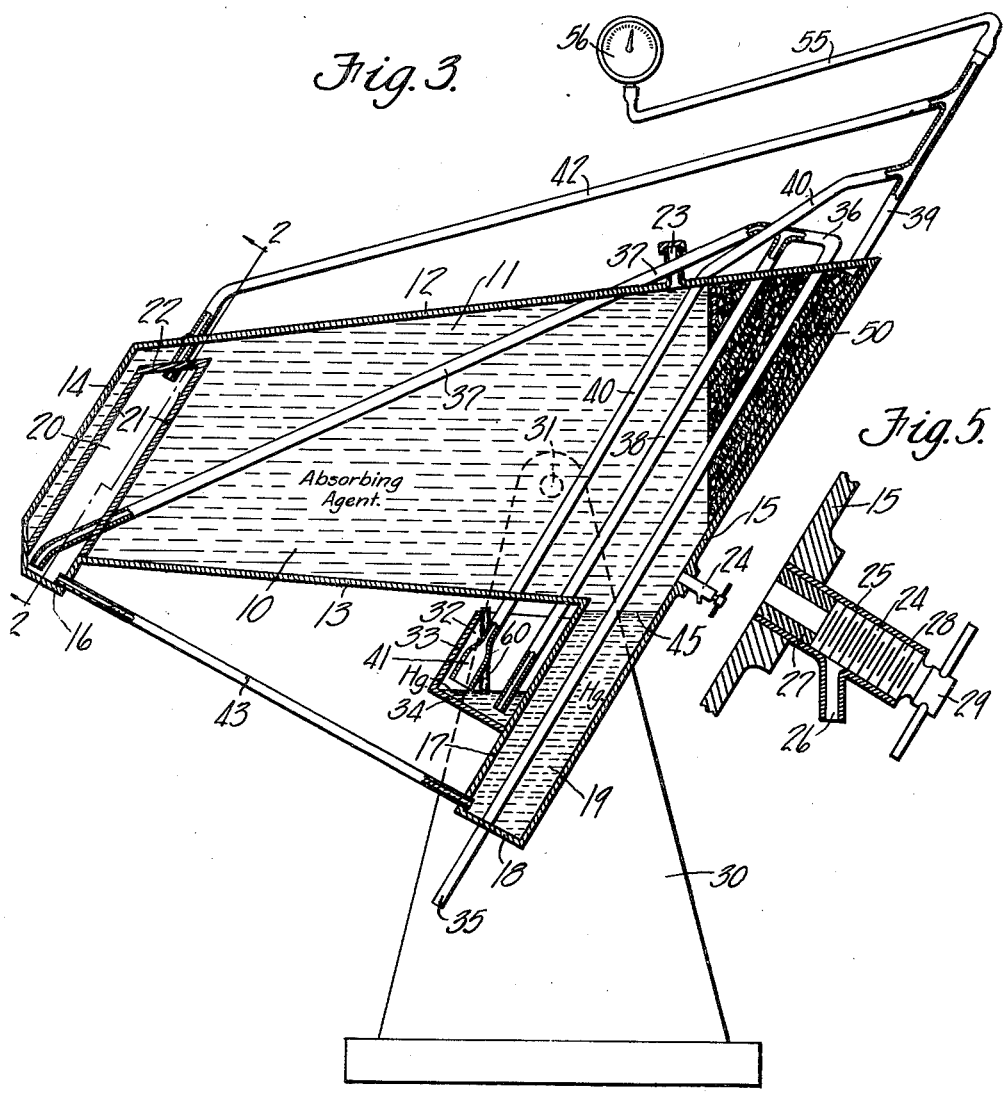

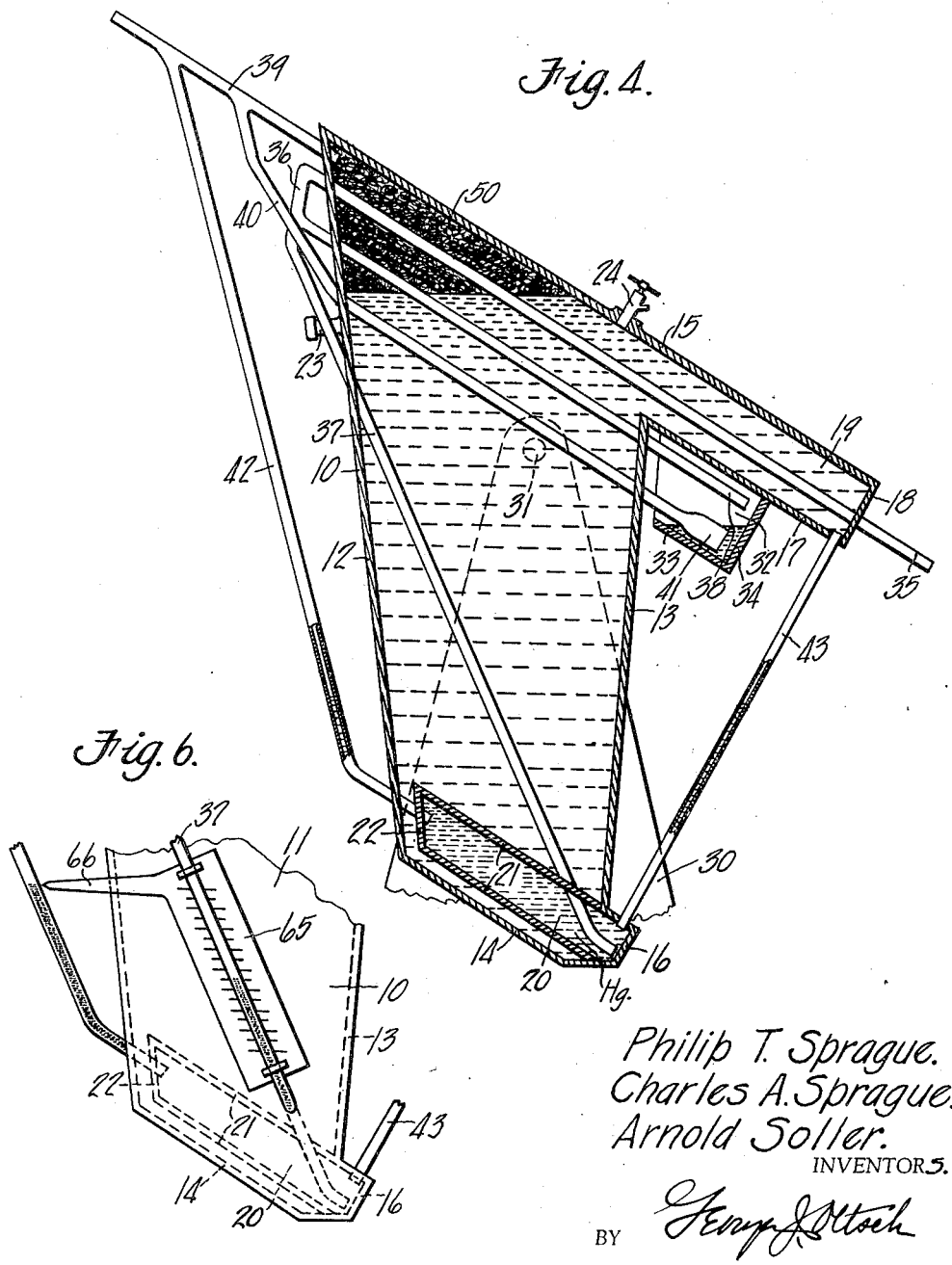

Patented Nov. 14, 1939

2,179,867

UNITED STATES PATENT OFFICE 2,179,867

GAS ANALYZER

Philip T. Sprague, Charles A. Sprague, and Arnold Soller, Michigan City, Ind.

Application February 19, 1934, Serial No. 711,982

21 Claims. (Cl. 23—256)

The invention relates to gas analyzers, and particularly to analyzing apparatus adapted to measure the amount of a given gas, as carbon dioxide, oxygen or sulphur dioxide, in a gas being tested.

Heretofore gas analyzers for the purpose have been constructed in various manners requiring manipulation of valves, the use of a cooling medium, considerable manual handling, and other objectionable operations in their use. A further disadvantage found in prior gas analyzers has been that the absorbing element, in the case of absorbing type analyzers, acts upon the gas to be analyzed in the supplying of the gas to the device, whereby inaccuracies result due to improper measurement of the amount of gas being tested, the apparatus thus recording or indicating erroneously.

It is therefore the primary object of the invention to provide a device by which these objections are overcome.

A further object is to provide a gas analyzer in which mercury is utilized to form a seal for conduits of the analyzer in its use, whereby the use of mechanical valves which must be independently manually operated, is eliminated.

A further object is to provide a gas analyzer shiftable to either of two predetermined positions and provided with fluid sealing means for automatically opening and closing the conduits of the device as required for the purpose and use of the device in each of such positions.

A further object is to provide a device in which the gas measuring chamber is at all times substantially sealed from the gas absorbing agent.

A further object is to provide a gas analyzer in which means is provided to force the gas from the gas measuring chamber to the absorbing chamber.

A further object is to provide a gas analyzer of inexpensive construction and simple to operate.

A further object is to provide a gas analyzer by which repeated analyses may be made at frequent closely spaced intervals of time to permit the use of a recorder therewith.

A further object is to provide a gas analyzer in which the analyzing agent forms means for cooling the gas to be analyzed, whereby said gas is at the same temperature when measured as when analyzed, without being acted upon by independent cooling means.

A further object is to provide a device of this character which forms its own indicator independent of the separate indicating device as is usually required with these devices.

A further object is to provide a device of this character utilizing, in addition to an absorbing agent, a liquid of greater specific gravity than and chemically immune to the action of said agent to serve as a mechanical element in said device.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is an end view of the device.

Figure 2 is a vertical transverse sectional view of the device taken on line 2—2 of Figure 3.

Figure 3 is a longitudinal vertical sectional view of the device taken on line 3—3 of Figure 1 and illustrating the device in its sample-taking position.

Figure 4 is a longitudinal vertical sectional view of the device illustrating the absorption and measurement position of the device.

Figure 5 is a sectional view of the valve for discharging the absorbing agent.

Figure 6 is a fragmentary side view of a modified form of the device disposed in its absorption and measurement position.

Referring to the drawings, which illustrate the preferred embodiment of the invention, the numeral 10 designates a container or casing whose normal position is illustrated in Figure 3. This comprises spaced vertical front and back walls 11, top wall 12, bottom wall 13, and side walls 14 and 15. The top wall 12 extends at an angle to the horizontal whereby the end thereof joining wall 15 is normally higher than its opposite end. Bottom wall 13 also extends at an angle to the horizontal, but in oppositely inclined relation to top wall 12, whereby the vertical dimension of the casing is greater adjacent wall 15 than at the portion thereof adjacent wall 14. Walls 14 and 15 extend in substantially parallel relation and at an angle to the vertical. An offset 16 is formed in bottom wall 13 to provide a small depending pocket in the casing adjacent side wall 14. At the other end of the casing, walls 11 and side wall 15 are extended a substantial distance below bottom wall 13, and walls 17 and 18 are provided in connection with said extensions to form a depending chamber 19 opening into the casing at its upper end. In spaced relation to side wall 14 and front and back walls 11 is formed a closed chamber 20 by means of side walls 21 and top wall 22, the bottom of said chamber 20 being formed by off-set 16 of bottom wall 13. The casing 10 is formed of fluid-tight construction, as of sheet metal plates welded at their joints or by casting.

A spout 23 is provided in the top of the casing, by means of which the casing may be filled. A valve 24 is mounted in the side wall 15 at a point adjacent a projection of bottom wall 13, said valve being welded or otherwise secured to the casing 10 to render the joint thereof with said casing fluid-tight. Valve 24 comprises a tubular body 25 having an outlet spout 26 communicating therewith. An annular member 27, preferably formed of rubber or other material which will not be attacked by a gas absorbing agent, is mounted in said tubular body between the casing and spout 26. A plug 28 is threaded in the outer end of valve body 25 and is adapted to bear against the end of annular member 27 to form a tight closing seal. Suitable finger operating means 29 are carried by plug 28 to permit operation of said plug.

The casing 10 is mounted on a suitable standard 30 for pivotal movement about a pivot 31.

An open-ended liquid container 32 is carried by and partially formed by wall 17 of casing 10 below bottom wall 13, said container being formed by side walls 33 and bottom wall 34 secured to wall 17 of casing 10.

A tube 35 extends through the casing and chamber 19 in spaced parallel relation to casing wall 15, said tube extending below casing wall 18 and above casing wall 12. In spaced relation to casing wall 12, tube 35 is bent to provide a short portion 36 thereof extending adjacent wall 12 of the casing, and the tube 35 is thence angularly downwardly bent to provide a portion 37 thereof which extends through casing wall 12 and through one of the walls 21 of chamber 20, wherein it terminates. Another tube 38 branches or by-passes from portion 36 of tube 35, with which it communicates, and extends therefrom into the casing through wall 12, and thence out of the casing through bottom wall 13, said by-pass tube 38 extending into open-ended container 32 to terminate adjacent bottom wall 34 of said container. A third tube 39 having a capillary or very small bore is carried by the casing and extends from a point just within casing wall 12 and in closely spaced relation to wall 15 in angularly upwardly directed relation, substantially parallel to casing wall 15. From the tube 39 branches a by-pass tube 40 which extends angularly downwardly to and through casing wall 12, and thence in spaced parallel relation to tube 38, said by-pass tube 40 extending through casing wall 13 and into container 32 with its lower end preferably spaced from bottom wall 34 substantially equally to the spacing of the end of tube 38 from said container wall, but in a position whereby it does not extend into the mercury in said container. The lower end of tube 40 is preferably enlarged at 41 for purposes to be hereinafter set forth. Another tube 42 branches from tube 39 at a point above tube 40, and extends along the upper side of said casing to a point adjacent wall 14 where it extends through casing wall 12 and also through chamber wall 22 to terminate in the upper portion of chamber 20. A tube 43 extends, at opposite ends thereof, through casing wall 17 and off-set 16 at the lower ends thereof to communicate with the chambers 19 and 20 of the casing.

In the use of the device, chamber 19 of casing 10 is filled with mercury to the approximate level indicated by line 45, the mercury assuming the same level in tube 43 to preferably bring said level adjacent to but spaced from chamber 20. The remainder of casing 10 is then filled with an absorbing agent, the character of which depends upon the particular gas, as carbon dioxide, oxygen, or sulphur dioxide, to be measured, the absorbing agent, in the case carbon dioxide is being measured or tested for, generally being caustic (KOH). It will be seen that the absorbing agent surrounds the walls 21, 22 of chamber 20, but that it cannot enter said chamber, and further that the lower level of the agent is coincident with the upper level of the mercury with which it will not chemically react and whose specific gravity is greater than that of the agent. A quantity of steel wool 50 is inserted in the casing, for purposes to be hereinafter set forth, as illustrated in Figure 3, at the corner of the casing formed by casing walls 12 and 15, the lower end of tube 39 projecting into said steel wool. Open-ended container 32 is also filled with mercury to the level indicated in Figure 3, whereby the lower end of by-pass tube 38 is normally immersed therein and the lower end 41 of by-pass tube 40 is normally spaced above said mercury.

The gas whose $CO_2$, $O_2$, $SO_2$, or other particular content is to be tested is supplied to the analyzer while the same is positioned as illustrated in Figure 3, through the tube 35. The gas passes through tube 35, portion 36 thereof, portion 37 thereof, chamber 20, tube 42, tube 39, by-pass tube 40 and out to the atmosphere. This path is followed by virtue of the fact that by-pass tube 38 is sealed by the mercury in container 32, and the upper end of tube 39 has connected therewith a flexible or other conduit 55 which in turn is connected to a suitable vacuum gage 56. Furthermore, inasmuch as tube 39 has a capillary bore and by-pass 40 is open to atmosphere, only an insignificant quantity of the gas passes through said tube into casing 10 during the sampling operation, particularly since passage of gas into the casing through tube 39 must be against mercury pressure. The gas is passed through this path in the analyzer until all previous samples of gas are forced out of the analyzer and until it is certain that chamber 20 has been filled with the new sample. The casing 10 is then pivoted or turned to the position illustrated in Figure 4; in which position the mercury in chamber 19 passes through tube 43 and into chamber 20 to seal the end of and pass upwardly in tube 37, and also to pass upwardly into tube 42. The pivoting of casing 10 also shifts the mercury in container 32 whereby the lower end 41 of by-pass tube 40 is sealed thereby and by-pass tube 38 is opened to atmosphere. The entrance of mercury in chamber 20 forces the gas contained in said chamber through tube 42, and tube 39, into the steel wool, which, having been wetted by the absorbing agent, serves to absorb the $CO_2$ or other content for which the gas is analyzed. This absorption of the gas produces a reduction in pressure, or a vacuum, in tube 39 and tube 42, which acts to draw into the steel wool all gas contained in said tubes for further and complete absorption, and which vacuum is registered by the gage 56 connected with tube 39 to supply a reading from which the $CO_2$ or other content can readily be determined, based upon the known volume of the gas whose $CO_2$ content is absorbed, which volume is that of chamber 20 plus tubes 42, 39 and 40. After the reading is obtained, the casing 10 is again pivoted to the position shown in Figure 3, and another sample can be taken.

One of the outstanding advantages obtained by this particular construction is that the absorbing agent never comes into contact with the inner walls of any of the tubes or chambers which confine or conduct the gas during the sampling operation described. In this way, the interval of time necessary for each sampling operation is greatly reduced, inasmuch as substantially no absorption can take place during the sampling operations, and it is only necessary that sufficient of the new gas be passed through the analyzer to insure exhaust of the previous sample thereof. In this connection it will be obvious, from a consideration of the well known characteristics of mercury, that the absorbing agent will not mix with the mercury due to the much greater specific gravity of the mercury, and the lack of sufficient agitation of the liquids to produce such a mixture temporarily. The chamber 19 is of greater capacity than the combined capacities of chamber 20 and tube 43. Consequently, only mercury will enter chamber 20 through tube 43, and this will not wet the chamber walls 21 or in any other way serve as a detriment in the use of the device. Thus this device enables tests to be made at frequent intervals, whereby the gage 56 may be either an indicating or a recording gage.

Another important advantage obtained from this construction resides in the fact that the mercury in casing 10 and in container 32 changes its position in the pivoting of said casing to automatically and selectively seal the various tubes of the device and thereby automatically control, without requiring the independent manual operation of mechanical valves commonly employed in devices of this character, the gas supply, exhaust and by-passing. In addition to the simplicity of operation thus afforded, a continuous feed of the gas to the analyzer is permitted; the gas, during the absorbing operation or cycle of use of the device, passing through tube 35, tube 36, and out to the atmosphere through by-pass tube 38, or during the sampling operation or cycle, passing through the chamber 20 and out through by-pass tube 40 in the manner or path heretofore described.

Another feature of the device resides in directing the sample of the gas, during the sampling operation or cycle, through the analyzer in a manner whereby the gas is brought to a temperature common to the absorbing agent, so that it is measured and absorbed at the same temperature, without requiring the use of independent or ancillary means for this purpose as is now common in the art. Thus, it will be seen that the gas is conducted through a long run of tube 35 which passes through the absorbing agent, through a similar run of tube 37 surrounded by the agent, and through the chamber 20 which, except at its bottom, is surrounded on all sides by the agent. The absorbing agent therefore serves a definite function in each cycle of use of the device, being a medium for equalizing the temperature of the gas to the temperature thereof in the sampling cycle and an absorbing agent in the absorption cycle.

It will be seen that the tube 39 is positioned in an angularly upwardly directed position in each of the two operative positions of the analyzer. Consequently, the point from which by-pass tube 40 branches from tube 39 is always lower than the point from which tube 42 branches from tube 39. By virtue of this relative arrangement of the members, any passage of the absorbing agent upwardly in tube 39 as induced by vacuum or reduction of pressure in said tube incident to the absorbing operation, is discharged into the by-pass tube 40 and therefrom to container 32. None of the absorbing agent can therefore reach the gas measuring chamber 20 through the tube 42. To drain off the absorbing agent from the container 32, the maintaining of whose liquid content and liquid level constant is important in order that one of the by-pass tubes 38 and 40 may always be open to atmosphere and the other always sealed, a wick 60 formed of sponge rubber or other suitable material which will not be detrimentally attacked by the absorbing agent, is carried by the container 32 to extend therein to a point at or below the normal mercury level and also to hang outwardly thereof, whereby the absorbing agent may, by capillary action, pass out of container 32. The consistency of the mercury, of course, is such that it will not be drained by the wick.

The construction of the analyzer in the manner heretofore described enables the device, by the slight modification illustrated in Figure 6, to be constructed to be self-indicating. The modification utilizes the variations of the level assumed by the mercury in each of the tubes 42, 40 and 37, in the absorbing cycle or operation, to provide an indicator of the degree of absorption and consequently of content of $CO_2$, etc., being measured, which may be determined from a reading of a suitable scale juxtaposed to any of these tubes. The construction shown in Figure 6 is illustrative of the manner in which this modification may be made, and comprises the arrangement of at least a portion of the tube 37 exteriorly of casing 10 at a point adjacent the end of said casing carrying chamber 20. This tube, or at least the exteriorly disposed portion thereof, is transparent, and extends parallel to tube 42, which is also preferably transparent. A scale 65 is disposed between said tube and the casing, and is shiftable longitudinally of said tube, said scale being suitably calibrated to indicate either the degree of reduction of pressure in the tube or a translation or conversion thereof into indications of the content of the particular gas for which the analysis is made. Scale 65 carries a pointer 66 aligned with the zero mark of the scale, and in the use of the scale the same is shifted relative to tube 43 to bring the pointer 66 in alignment with the level of the mercury in tube 42, which level is variable and depends upon the suction resulting from absorption of a portion of the gas sample. The level of the mercury in tube 37 relative to said scale, which level is substantially constant for a given position of the device when said tube is open to atmosphere because it is substantially unaffected by the absorption, then indicates the degree of absorption or content of the gas absorbed. By this construction the independent gage 56 may be eliminated, in which event the upper end of tube 39 is suitably sealed to prevent escape of gas therethrough during the absorption cycle.

The enlarged portion 41 of by-pass tube 40 serves to compensate for the amount of mercury entering tube 37 in the absorption cycle, the enlargement receiving an amount of mercury equal to that which enters said tube 37. This construction prevents change of volume of the gage content, and resultant partial vacuum produced thereby, which vacuum, being unrelated to and not produced by the gas absorption, would tend to enlarge the vacuum in the device in the absorption cycle, and thus produce an erroneous reading.

The invention having been set forth, what is claimed as new and useful is:

1. In a gas analyzer, a pivotally mounted casing, a closed chamber disposed within said casing at one end thereof, a depending chamber communicating with said casing at the other end thereof, an open-ended container carried by the casing at the lower side thereof, steel wool disposed in the upper end of said casing above said depending chamber, a gas conduit extending through said casing to the lower end of said closed chamber, a second gas conduit extending from the top of said closed chamber to said casing adjacent said steel wool, a pair of by-passes each communicating with one of said conduits and terminating in spaced relation in said container, a tube connecting the lower ends of said closed chamber and said depending chamber, said container and said depending chamber containing mercury closing the end of the by-pass by said first conduit, said casing containing a gas absorbing agent, gas supplied to said analyzer normally passing to said closed chamber, said second gas conduit, and out to atmosphere through the by-pass of the second conduit, the mercury in said container shifting to close the by-pass of the second conduit and open the by-pass of said first conduit and the mercury in said depending chamber shifting to fill said closed chamber and thereby force the gas contained therein into said steel wool upon pivotal movement of said casing to relatively angular position and means for measuring the extent of gas absorption.

2. In a gas analyzer, a shiftable casing containing a gas absorbing agent and having a sampling position and a relatively angular absorbing position, a depending chamber carried by said casing and containing mercury, a closed measuring chamber disposed in said casing, a tube connecting the lower ends of said mercury chamber and measuring chamber, a mercury container carried by said casing and open to the atmosphere, a gas supply conduit extending through said casing to the lower end of said measuring chamber, a by-pass for said conduit extending into said mercury container, a second conduit extending between the top of said measuring chamber and said casing, a by-pass for said second conduit extending into said container, said first-named by-pass terminating in and said last named by-pass terminating above the mercury in said container when said casing is disposed in sampling position, whereby gas supplied to said first conduit passes through said measuring chamber, second conduit and last-named by-pass, the mercury in said container shifting to close said last named by-pass and open said first named by-pass and the mercury in said depending chamber shifting into said measuring chamber to close said first conduit and force gas in said measuring chamber through said second conduit to said casing upon shifting of said casing to absorbing position and means for measuring the extent of gas absorption.

3. In a gas analyzer, a casing containing a gas absorbing agent, a depending chamber carried by said casing and containing mercury, a closed measuring chamber disposed in said casing, a tube connecting the lower end of said mercury chamber and measuring chamber, a mercury container carried by said casing and open to the atmosphere, a conduit extending through said casing to the lower end of said measuring chamber, a second conduit extending from the top of said measuring chamber to said casing, a by-pass for said second conduit extending into said mercury chamber to terminate above the mercury therein, gas supplied to said first conduit passing through said measuring chamber, a second conduit and by-pass, said casing being shiftable to relative angular position to shift the mercury in the container and thereby immerse the end of said by-pass and to shift the mercury from the depending chamber to fill said measuring chamber and thereby close the end of said first conduit and force the gas contained in said measuring chamber into said casing and means for measuring the extent of gas absorption in said casing.

4. In a gas analyzer, a pivotally mounted casing containing a gas absorbing agent, a gas measuring chamber carried by said casing, a conduit communicating with said measuring chamber, a normally closed by-pass communicating with said conduit, a second conduit extending between said chamber and said casing, a normally open by-pass communicating with said second conduit, gas supplied to said first conduit passing through said chamber, second conduit and by-pass of said second conduit, means actuable upon pivoting of said casing to relative angular position to close said first conduit, open said first by-pass and close said second by-pass, and force the gas in said chamber through said second conduit into said casing and means for measuring the extent of gas absorption in said casing.

5. In a gas analyzer, a pivotally mounted casing containing a gas absorbing agent, a gas measuring chamber carried by said casing, a conduit communicating with said measuring chamber, a second conduit extending between said chamber and said casing, a normally open by-pass communicating with said second conduit, gas supplied to said first conduit passing through said chamber, second conduit and by-pass, means actuable upon pivoting of said casing to relatively angular position to close said first conduit and said by-pass and to force the gas contained in said chamber through said second conduit and means for measuring the extent of gas absorption in said casing.

6. In a gas analyzer, a pivotally mounted casing containing a gas absorbing agent, a gas measuring chamber carried by said casing, means supplying gas to said chamber, means for conducting gas from said chamber to said casing, means actuable upon pivoting of said casing to relative angular position to close said gas supply means and to force the gas in said chamber through said gas conducting means into said casing, and means for measuring the reduction of gas pressure resulting from absorption of the gas in said measuring chamber as it passes into said casing.

7. In a gas analyzer, a pivotally mounted casing containing a gas absorbing agent, a gas measuring chamber carried by said casing, a mercury containing member carried by said casing and communicating with the lower end of said chamber, means for conducting gas to said chamber, means connecting the top of said chamber with said casing for conducting gas from said chamber to said casing, said casing being shiftable to relative angular position to shift the mercury in said member into said measuring chamber to close said gas supply means and force the gas from said chamber into said casing and means for measuring the extent of gas absorption in said casing.

8. In a gas analyzer, a casing containing a gas absorbing agent, a gas measuring chamber, a member containing a non-absorbing liquid and communicating with the lower end of said chamber, a conduit communicating with said chamber, a second conduit extending from the upper end of said chamber to said casing, a second member containing a non-absorbing liquid, a by-pass communicating with said second conduit and extending into said second member above the liquid therein, gas supplied to said first conduit normally passing through said chamber, second conduit and by-pass, said liquid containing members being shiftable to empty the liquid of said first member into said chamber to exhaust the gas therefrom through said second conduit and to shift the liquid in said second member to immerse the end of said by-pass and means for measuring the extent of gas absorption in said casing.

9. In a gas analyzer, a casing containing a gas absorbing agent, a gas measuring chamber, a member containing a non-absorbing liquid and communicating with the lower end of said chamber, means for supplying gas to the lower end of said chamber, means for conducting gas from the top of said chamber to said casing, said casing, chamber and member being arranged in fixed relation to each other and being tiltable to empty the liquid from said member into said chamber to close said gas supply means and discharge the gas from said chamber to said casing and means for measuring the extent of gas absorption in said casing.

10. In a gas analyzer, a tiltable casing containing a gas absorbing agent, a gas measuring chamber, means for supplying gas to said chamber, means connecting said casing and the top of said chamber including a downwardly extending by-pass, gas supplied to said chamber normally exhausting through said by-pass, means actuated by tilting of the casing for closing said by-pass, means actuated by tilting of the casing for discharging gas from said chamber to said casing, said by-pass serving to drain from said connecting means the gas absorbing agent overflowing from said casing to said connecting means to prevent passage of said gas absorbing agent to said chamber and means for measuring the extent of gas absorption in said casing.

11. In a gas analyzer, a casing containing a gas absorbing agent, a gas measuring chamber, means for supplying gas to said chamber, means connecting the upper ends of said casing and said chamber, means for discharging gas from said chamber to said casing through said connecting means, downwardly extending means for draining from said connecting means any of the gas absorbing agent which overflows from said casing to said connecting means, and means for measuring the extent of gas absorption in said casing.

12. In a gas analyzer, a tiltable assembly including a casing containing a gas absorbing agent, a gas measuring chamber, means for supplying gas to said chamber, means connecting said casing and said chamber, and means actuated by gravity upon tilting of said assembly for closing said gas supply means and for discharging gas from said chamber to said absorption casing and means for measuring the extent of gas absorption in said casing.

13. In a gas analyzer, a tiltable unit including a casing containing a gas absorbing agent, a gas measuring chamber, means for supplying gas to said chamber at the lower end thereof, means connecting said casing and the upper end of said chamber, and means for filling said chamber with non-absorbing liquid to transfer the gas from the measuring chamber to said absorption casing and to close said gas supply means upon tilting of said unit, and means for measuring the extent of gas absorption in said casing.

14. In a gas analyzer, a casing containing a gas absorbing agent, a closed gas measuring chamber disposed in said casing, means for supplying gas to said chamber, a conduit connecting the upper end of said chamber and casing and including a portion extending upwardly from said casing and a by-pass extending downwardly from said upwardly extending conduit portion for draining the absorbing agent which overflows from said casing into said conduit to prevent passage of said absorbing agent from said casing to said measuring chamber, and means for measuring the extent of absorption in said casing.

15. In a gas analyzer, a tiltable assembly comprising a casing containing a gas absorbing agent, a gas measuring chamber, gas supply means communicating with the lower portion of said chamber, means substantially parallel to said gas supply means for connecting the upper end of said chamber and said casing, a member containing a non-absorbing liquid and communicating with the lower end of said chamber, tilting of said assembly shifting said liquid into said chamber to close said gas supply means and discharge gas from said chamber to said casing for absorption and resultant decrease in pressure, and a scale juxtaposed to said gas supplying means and said connecting means in their tilted position and utilizing the difference between the liquid levels therein when the gas supplying means is open to atmosphere for indicating the extent of gas absorption in said casing.

16. In a gas analyzer, a gas absorbing chamber, a gas measuring chamber, a gas supply conduit communicating with the lower end of said chamber, a conduit substantially parallel to said first conduit for connecting the upper ends of said chambers, means for filling said measuring chamber with non-absorbing liquid to discharge said gas to said absorption chamber for absorption and resultant decrease of pressure thereof, said liquid entering said conduits and assuming different levels therein when said first conduit is open to atmosphere and means utilizing the difference in the levels of said liquid for indicating the extent of absorption of said gas.

17. In a gas analyzer, a casing containing a gas absorbing agent, a gas measuring chamber disposed below the top of said casing, a gas supply conduit communicating with the lower end of said chamber, a gas transfer conduit extending above said casing and connecting said chamber and the top of said casing, a drain in said conduit extending downwardly therefrom, at an intermediate point thereof above said casing and a container for a non-absorbing liquid disposed below and communicating with said chamber, said container being shiftable to a position above said chamber to transfer said liquid to said chamber and thereby close said supply conduit and force said gas into said casing and means for measuring the extent of gas absorption in said casing.

18. In a gas analyzer, a gas absorbing chamber, a gas measuring chamber disposed below the top of said absorbing chamber, a gas transfer conduit connecting said chambers and including a central portion thereabove, by-pass extending downwardly from the central portion of said conduit, a pair of containers for a non-absorbing liquid, one of said containers being disposed below and communicating with said measuring chamber, the other container being open to atmosphere, said by-pass terminating in said last-named container above the normal liquid level thereof, said containers being simultaneously shiftable to transfer the liquid from one container to fill said measuring chamber and to immerse the end of the by-pass in the liquid of the other container and means for measuring the extent of gas absorption in said absorbing chamber.

19. In a gas analyzer, a casing containing a gas absorbing agent, a gas measuring chamber, a transparent tube for supplying gas to said chamber, a transparent tube connecting said chamber and casing, and extending adjacent and substantially parallel to said supply tube, means for filling said chamber with a non-absorbing liquid for closing said supply tube and forcing the gas from said chamber to said casing, said liquid entering and assuming different levels in said tubes when said supply tube is open to atmosphere and a scale utilizing the liquid level in both tubes to designate the amount of gas absorbed in said casing.

20. In a gas analyzing apparatus, the combination comprising a pivotally mounted rotatable frame, a chamber containing a gas absorption reagent, a chamber containing a displacement liquid, and a sample measuring vessel, all mounted on the rotatable frame in fixed relationship with respect to each other, conduit means for supplying a gas sample to the measuring vessel, means for segregating a fixed sample of gas in the said measuring vessel, conduit means connecting the respective bottoms of the said measuring vessel and the chamber containing the displacement liquid, conduit means connecting the top of the sample measuring vessel with the chamber containing the gas absorption reagent, and means for measuring the extent of gas absorption resulting from a rotation of the said frame in a manner to cause the said displacement liquid to force the said gas sample from the measuring vessel into the chamber containing the gas absorption reagent.

21. In a gas analyzer, a tiltable assembly including a casing containing an absorbing agent and an inert fluid of greater specific gravity than the agent, a gas measuring chamber communicating with said casing and positioned above the normal level of the inert fluid, a container for inert fluid, a gas supply passage communicating with said casing, chamber and container, tilting of said assembly causing said inert fluid to close the intake and exhaust ends of said passage and shifting of the first fluid into said chamber to force the gas into said casing adjacent said absorbing agent, and means for measuring the extent of gas absorption in said casing.

PHILIP T. SPRAGUE.
CHARLES A. SPRAGUE.
ARNOLD SOLLER.